United States Patent [19]

Gupta

[11] 4,244,777

[45] Jan. 13, 1981

[54] BLEACHING STILBENE YELLOW DYED WOOD PULP

[75] Inventor: Maharaj K. Gupta, Renton, Wash.

[73] Assignee: Weyerhaeuser Company, Tacoma, Wash.

[21] Appl. No.: 92,152

[22] Filed: Nov. 7, 1979

[51] Int. Cl.³ .............................................. D21C 5/02
[52] U.S. Cl. ....................................... 162/6; 162/67; 162/87
[58] Field of Search ............... 162/6, 67, 87; 8/108 A, 8/156

[56] References Cited

U.S. PATENT DOCUMENTS

| | | | |
|---|---|---|---|
| 2,580,161 | 12/1951 | Driesen | 162/6 |
| 3,238,008 | 3/1966 | Litke | 162/6 |
| 3,377,235 | 4/1968 | Webster et al. | 162/6 |

FOREIGN PATENT DOCUMENTS 2254862  5/1973  Fed. Rep. of Germany.

*Primary Examiner*—Peter Chin

[57] ABSTRACT

Chlorine dioxide is a specific bleaching agent for stilbene yellow dye which has been used to dye paper stock. Chlorine dioxide may be used in amounts as low as 0.25% based on the oven dry weight of the pulp fiber.

6 Claims, No Drawings

BLEACHING STILBENE YELLOW DYED WOOD PULP

CROSS REFERENCE TO RELATED APPLICATION

This application contains material that is common to my copending patent application Ser. No. 8,460 filed Feb. 1, 1979.

BACKGROUND OF THE INVENTION

1. Field of the Invention
Bleaching stilbene yellow.
2. Summary of the Invention At the present time it is considered environmentally sound to repulp paper for reuse. One type of paper that may be reused is the yellow pages of telephone books. One of the stilbene yellow dyes is the dye that is used to color these pages. At the present time the sole reuse of these pages is as a furnish for new yellow pages since it has not been possible to remove the yellow color.

One of the reasons for this is that the exact composition of the stilbene yellow dyes is considered to be unknown or undetermined. This is the statement given in the Chemline Databank.

It has now been found that chlorine dioxide is a specific bleaching agent for stilbene yellow dye. Concentrations of chlorine dioxide as low as 0.25% up to 4% based on the oven dry weight of the paper fiber are enough to bleach the stilbene yellow. Other bleaching agents have been tried and do not bleach the dye.

DESCRIPTION OF THE PREFERRED EMBODIMENT

Paper dyed with a stilbene yellow dye was placed in a beater, water was added and the material beaten until it was repulped. It had a consistency of 36.3%. The consistency is the amount of fiber in solution and is given as a percent of the weight of the fiber-water slurry. Water was added to reduce the consistency of the slurry to 10%.

Samples were then treated with chlorine dioxide. Each of the samples contained 5 grams of fiber on an oven-dry basis. The treatment was for an hour at 70° C. The pH of the material was not adjusted. The table gives the amount of chlorine dioxide added as a percent of the oven-dry weight of the fiber, in grams, and in milliliters of solution based on a chlorine dioxide weight of 8.7 grams/liter. The table also gives the GE brightness of the bleached pulp.

TABLE I

| Ex. | ClO$_2$ % | 9m | ml | GE Brightness |
|---|---|---|---|---|
| 1 | 0.25 | 0.0125 | 1.4 | 63.2 |
| 2 | 0.5 | 0.025 | 2.8 | 65.7 |
| 3 | 1.0 | 0.05 | 5.6 | 67.8 |
| 4 | 2.0 | 0.10 | 11.2 | 65.5 |

Other bleaching agents such as ozone, oxygen, hydrogen peroxide, chlorine and hypochlorite were tried and did not bleach the stilbene yellow. From this it was concluded that chlorine dioxide was a specific bleaching agent for stilbene yellow.

The usual conditions for chlorine dioxide bleaching would be used. These would include the in situ formation of chlorine dioxide as, for example, by the reaction of sodium chlorite with a suitable acid, or in the presence of hypochlorite.

What is claimed is:

1. A process for bleaching stilbene yellow dyed wood pulp said dye not being bleachable by ozone, oxygen, hydrogen peroxide, chlorine or hypochlorite, comprising repulping stilbene yellow dyed paper in water to form an aqueous slurry of stilbene yellow dyed wood pulp, treating said slurry with chlorine dioxide in an amount sufficient to bleach and remove the yellow color of said wood pulp.

2. The process of claim 1 in which said chlorine dioxide is used in an amount of up to 4% of the oven-dry weight of said wood pulp.

3. The process of claim 1 in which said chlorine dioxide is used in an amount of up to 2% of the oven dry weight of said wood pulp.

4. The process of claim 1 in which said chlorine dioxide is used in an amount of up to 1% of the oven-dry weight of said wood pulp.

5. The process of claim 1 in which said chlorine dioxide is used in an amount of up to 0.5% of the oven-dry weight of said wood pulp.

6. The process of claim 1 in which said chlorine dioxide is used in an amount of at least 0.25% of the oven-dry weight of said wood pulp.

* * * * *